United States Patent
Lee

(10) Patent No.: US 9,827,854 B2
(45) Date of Patent: Nov. 28, 2017

(54) DRIVING CONTROL SYSTEM OF VEHICLE AND METHOD FOR CHANGING SPEED SETTING MODE USING THE SAME

(71) Applicant: HYUNDAI MOTOR COMPANY, Seoul (KR)

(72) Inventor: Kyoung Jun Lee, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/810,161

(22) Filed: Jul. 27, 2015

(65) Prior Publication Data

US 2016/0159351 A1 Jun. 9, 2016

(30) Foreign Application Priority Data

Dec. 3, 2014 (KR) ......................... 10-2014-0172309

(51) Int. Cl.
*B60T 8/32* (2006.01)
*G05D 1/00* (2006.01)
(Continued)

(52) U.S. Cl.
CPC ............ *B60K 35/00* (2013.01); *B60W 30/16* (2013.01); *B60K 2350/2008* (2013.01); *B60W 2550/22* (2013.01)

(58) Field of Classification Search
CPC ....... B60W 10/196; B60W 2050/0089; B60W 2050/0292; B60W 20/00; B60W 20/30; B60W 2510/0241; B60W 2510/0638; B60W 2510/10; B60W 2510/104; B60W 2510/305; B60W 2520/105; B60W 2530/14; B60W 2540/04; B60W 30/02;
(Continued)

(56) References Cited

U.S. PATENT DOCUMENTS 6,370,471 B1 * 4/2002 Lohner .............. B60K 31/0008
701/36
6,789,637 B1 * 9/2004 Winner .............. B60K 31/0008
180/170

(Continued)

FOREIGN PATENT DOCUMENTS

JP 10-329575 A 12/1998
JP 2000-118261 A 4/2000
(Continued)

*Primary Examiner* — Nicholas Kiswanto
*Assistant Examiner* — Kenny A Taveras
(74) *Attorney, Agent, or Firm* — McDermott Will & Emery LLP

(57) ABSTRACT

A driving control system of a vehicle sets a target speed as an automatic setting speed when the driving control system is an automatic speed setting mode, changes a speed setting mode to a manual speed setting mode when a speed change input is received in the automatic speed setting mode, sets the target speed as a manual setting speed when the driving control system is a manual speed setting mode, changes the manual setting speed depending on the speed change input when the speed change input is received in the manual speed setting mode, and changes the speed setting mode to the automatic speed setting mode when the manual setting speed coincides with the automatic setting speed in the manual speed setting mode.

18 Claims, 5 Drawing Sheets

(51) Int. Cl.
*G06F 7/00* (2006.01)
*B60K 35/00* (2006.01)
*B60W 30/16* (2012.01)

(58) Field of Classification Search
CPC .. B60W 30/085; B60W 30/09; B60W 30/095;
B60W 30/0956; B60W 30/10; B60W
30/12; B60W 30/14; B60W 30/16; B60W
30/18; B60W 30/18045; B60W 30/18072;
B60W 30/18109; B60W 30/18136; B60T
2210/20; B60T 2210/22; B60T 2210/36;
B60T 7/122; B60T 8/1755; B60T 8/245;
B60K 17/105; B60K 2007/0038; B60K
2007/0092; B60K 2350/2008; B60K
23/00; B60K 25/06; B60K 2741/045
See application file for complete search history.

(56) References Cited

U.S. PATENT DOCUMENTS

| | | | | |
|---|---|---|---|---|
| 7,319,927 | B1 * | 1/2008 | Sun | B60W 10/06 180/170 |
| 8,589,045 | B2 * | 11/2013 | Seymour | B60T 7/22 303/121 |
| 8,818,677 | B2 * | 8/2014 | Inoue | B60W 10/06 701/93 |
| 8,843,288 | B1 * | 9/2014 | Rogalski | B60W 30/143 701/65 |
| 9,268,332 | B2 * | 2/2016 | Montemerlo | G05D 1/0214 |
| 9,442,484 | B2 * | 9/2016 | Park | G05D 1/0061 |
| 2011/0130928 | A1 * | 6/2011 | Matsunaga | F16H 61/10 701/52 |
| 2013/0013161 | A1 * | 1/2013 | Otsubo | B60W 10/06 701/52 |
| 2015/0151747 | A1 * | 6/2015 | Fairgrieve | B60T 7/22 701/91 |
| 2015/0191160 | A1 * | 7/2015 | Fairgrieve | B60K 31/02 701/93 |
| 2015/0210290 | A1 * | 7/2015 | Hemes | B60W 50/082 701/36 |
| 2015/0217768 | A1 * | 8/2015 | Fairgrieve | B60W 30/143 701/93 |
| 2015/0217771 | A1 * | 8/2015 | Kelly | B60W 30/025 701/93 |
| 2015/0353087 | A1 * | 12/2015 | Niino | B60W 30/16 701/96 |
| 2016/0121862 | A1 * | 5/2016 | Richards | B60W 30/143 701/37 |
| 2016/0159351 | A1 * | 6/2016 | Lee | B60K 35/00 701/93 |
| 2016/0179092 | A1 * | 6/2016 | Park | G05D 1/0061 701/23 |
| 2016/0185350 | A1 * | 6/2016 | Kelly | B60W 10/06 701/94 |
| 2016/0194001 | A1 * | 7/2016 | Kelly | B60K 28/165 701/41 |
| 2016/0194002 | A1 * | 7/2016 | Kelly | B60W 50/14 701/22 |
| 2016/0200323 | A1 * | 7/2016 | Kelly | B60W 50/12 701/51 |
| 2016/0244057 | A1 * | 8/2016 | Kelly | B60W 30/143 |
| 2016/0244060 | A1 * | 8/2016 | Fairgrieve | B60W 50/085 |

FOREIGN PATENT DOCUMENTS

| | | |
|---|---|---|
| JP | 2002-144912 A | 5/2002 |
| JP | 2009-040414 A | 2/2009 |
| JP | 2012-51441 A | 3/2012 |
| JP | 2014-180894 A | 9/2014 |
| JP | 2014-182453 A | 9/2014 |
| KR | 10-2002-0019528 A | 3/2002 |

* cited by examiner

DRIVING CONTROL SYSTEM OF VEHICLE AND METHOD FOR CHANGING SPEED SETTING MODE USING THE SAME

CROSS-REFERENCE TO RELATED APPLICATION

This application is based on and claims the benefit of priority to Korean Patent Application No. 10-2014-0172309, filed on Dec. 3, 2014 in the Korean Intellectual Property Office, the disclosure of which is incorporated herein in its entirety by reference.

TECHNICAL FIELD

The present disclosure relates to a driving control system of a vehicle and a method for changing a speed setting mode using the same.

BACKGROUND

Recently, an advanced driver assistance system (ADAS) has drawn much attention by car makers. The advanced driver assistance system may include various systems such as a system which automatically controls driving of a vehicle to enhance driving convenience of a driver and a system which senses risks in advance to cope therewith so as to assure safety of a driver.

A driver assistance system for providing driver convenience may include smart cruise control (SCC), lane guidance (LG), and the like. The smart cruise control (SCC) may allow a vehicle to be constantly driven depending on a speed set by a driver or a speed limit of a driving road, without the driver operating an accelerator. In other words, when a vehicle approaches a preceding vehicle, the smart cruise control (SCC) controls a vehicle speed so that the vehicle is driven while constantly keeping a distance from the preceding vehicle. The lane guidance LG may allow a vehicle to be driven along a center of a lane.

As various apparatuses for enhancing the convenience of a driver such as the advanced driver assistance system are added, the number of operating switches for operating the apparatuses which are equipped in a vehicle is increased correspondingly. However, the increase in the number of operating switches causes confusion and inconvenience to a driver, which may lead to a dispersion of driver's eye or concentration or poor driving of a driver while driving and may be ultimately continued to vehicle accidents.

SUMMARY

The present disclosure has been made to solve the above-mentioned problems occurring in the prior art while advantages achieved by the prior art are maintained intact.

An aspect of the present disclosure provides a driving control system of a vehicle and a method for changing a speed setting mode using the same capable of intuitively changing the speed setting mode by a simple operation.

Another aspect of the present disclosure provides a computer-readable recording medium in which programs for allowing a computer to run a method for changing a speed setting mode using a driving control system are recorded. The technical problem to be achieved by the exemplary embodiment of the present disclosure is not limited to the technical problems as described above, and therefore other technical problems may be present.

According to an exemplary embodiment of the present disclosure, a driving control system of a vehicle includes: a speed setting unit configured to set a target speed as one of an automatic setting speed and a manual setting speed depending on a speed setting mode; a driving control unit configured to control a driving speed of the vehicle depending on the target speed set by the speed setting unit; a first input unit configured to receive a speed change input; and a mode setting unit configured to change the speed setting mode to a manual speed setting mode when receiving the speed change input in the automatic speed setting mode and change the speed setting mode to the automatic speed setting mode when the manual setting speed coincides with the automatic setting speed in the manual speed setting mode.

According to another exemplary embodiment of the present disclosure, a method for changing a speed setting mode using a driving control system of a vehicle includes: when the driving control system is an automatic speed setting mode, setting a target speed as an automatic setting speed; when a speed change input is received in the automatic speed setting mode, changing a speed setting mode to a manual speed setting mode; when the driving control system is a manual speed setting mode, setting the target speed as a manual setting speed; when the speed change input is received in the manual speed setting mode, changing the manual setting speed depending on the speed change input; and when the manual setting speed coincides with the automatic setting speed in the manual speed setting mode, changing the speed setting mode to the automatic speed setting mode.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

Figure 1:
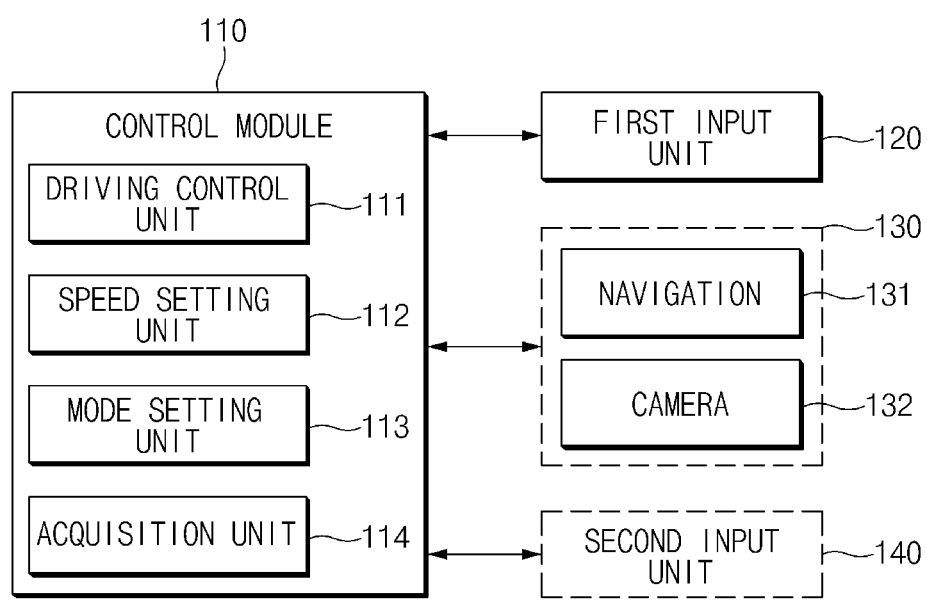
FIG. 1 is a block diagram illustrating a driving control system according to an exemplary embodiment of the present disclosure.

Hereinafter, the present disclosure will be described with reference to the accompanying drawings. Throughout the accompanying drawings, the same components will be denoted by the same reference numerals. In addition, a detail description for functions and/or configurations that have been well-known will be omitted. The following disclosed contents mainly describe portions required to understand operations according to various embodiments and the description of elements which make the gist of the description obscure will be omitted.

In the present specification, "A or B", expressions such as "at least one of A or/and B", "one or more of A or/and B", or the like may include all the possible combination of terms listed together. For example, "A or B", expressions such as "at least one of A and B", "at least one of A or B" may represent cases of (1) including at least one A, (2) including at least one B, or (3) including both of at least one A and at least one B.

In various exemplary embodiments, expressions such as "first" and "second" may represent various components without regard to order and/or importance and do not limit the corresponding components. For example, a first vehicle and a second vehicle may represent different vehicles without regard to order or importance. For example, the 'first' component may be named the 'second' component and the 'second' component may also be similarly named the 'first' component, without departing from the scope of the present disclosure.

In addition, some components in the accompanying drawings may be exaggerated, omitted, or schematically shown. Sizes of the respective components do not reflect actual sizes of the respective components. Therefore, contents mentioned herein are not limited by relative sizes or intervals between components shown in the accompanying drawings.

FIG. 1 is a block diagram illustrating a driving control system according to an exemplary embodiment of the present disclosure.

Referring to FIG. 1, a driving control system 100 may include a control module 110, a first input unit 120, and a monitoring device 130. Further, according to various exemplary embodiments of the present disclosure, the driving control system 100 of FIG. 1 may further include a second input unit 140 or a display unit (not illustrated).

Only components associated with the present embodiments will be described in the present specification to prevent features of the present embodiments from being obscured. Therefore, a person having ordinary skill in the art to which the present disclosure pertains may understand that in addition to the components illustrated in FIG. 1, other general-purpose components may be added.

The driving control system 100 is a driver assistance system for providing driving convenience of a driver and may control a vehicle to be driven at a constant speed depending on a target speed. The target speed may be automatically or manually set depending on a speed setting mode. A speed setting mode in which a target speed is automatically set is called an automatic speed setting mode and a speed setting mode in which the target speed is manually set by a driver is called a manual speed setting mode.

According to an exemplary embodiment of the present disclosure, the driving control system 100 may be enabled when a vehicle enters a main line of an express highway and may be disabled when the vehicle deviates from the main line of the express highway. The driving control system 100 may use a monitoring device 130 to determine whether the vehicle enters the main line of the express highway or the vehicle deviates from the main line of the express highway. This will be described in detail with reference to FIG. 3. Alternatively, the driving control system 100 may be enabled or disabled by a user input. The driving control system 100 is not limited to the exemplary embodiments as described above, and therefore may be enabled or disabled by other methods.

According to the exemplary embodiments of the present disclosure, the driving control system 100 may further include driver assistance systems such as smart cruise control (SCC) and lane guidance (LG). Therefore, a vehicle drives along a center of a lane at a constant speed depending on a target speed which is automatically or manually set by the driving control system 100 and then when a vehicle approaches a preceding vehicle, the driving control system may reduce a driving speed to keep a predetermined distance from the preceding vehicle. When the vehicle is again far away from the preceding vehicle, the driving control system 100 may increase the driving speed of the vehicle to the set target speed.

When the driving control system 100 is enabled, the control module 110 may set the speed setting mode and set the target speed depending on the speed setting mode. Hereinafter, for convenience of explanation, a method for changing a speed setting mode using the driving control system 100 will be described depending on a function which is performed by the control module 110.

The control module 100 may include a driving control unit 111, a speed setting unit 112, a mode setting unit 113, and an acquisition unit 114. The control module 110 may be configured of at least one processor and units illustrated in FIG. 1 may be operated with being included in one processor or at least two processors.

The driving control unit 111 may control a driving speed of a vehicle to be driven depending on the target speed. According to the exemplary embodiment of the present disclosure, the driving control unit 111 may control the driving of the vehicle so that the vehicle is driven along a center of a vehicle. Alternatively, according to the exemplary embodiment of the present disclosure, the driving control unit 111 may control the driving of the vehicle so that the vehicle keeps a predetermined distance from the preceding vehicle.

The speed setting unit 112 may set the target speed as any one of an automatic setting speed and a manual setting speed depending on the speed setting mode which is set by the mode setting unit 113. The automatic setting speed may represent a speed which is automatically changed without driver's intervention and the manual setting speed may represent a speed which is manually changed by the driver. The speed setting unit 112 may set the automatic setting speed as the target speed in the automatic speed setting mode and set the manual setting speed as the target speed in the manual speed setting mode.

According to the exemplary embodiment of the present disclosure, the automatic setting speed may be automatically changed depending on a speed limit of a driving road of a vehicle. For example, the speed setting unit 112 may set the speed limit of the driving road of the vehicle as the automatic setting speed or set a larger value by a threshold value than the speed limit of the driving road of the vehicle or a smaller value by the threshold value than the speed limit of the driving road of the vehicle as the automatic setting speed. Therefore, in the automatic speed setting mode, the target speed may be automatically changed depending on the speed limit of the driving road of the vehicle.

The manual setting speed may be manually changed by a speed change input received through the first input unit 120. For example, the speed setting unit 112 may set the manual setting speed based on the speed change input. For example, when receiving a first speed change input, the speed setting unit 112 may increase a current manual setting speed as much as a unit speed (i.e. a basic unit set for increasing speed). When receiving a second speed change input, the speed setting unit 112 may decrease the current manual setting speed as much as the unit speed. Alternatively, when receiving the speed change input corresponding to a predetermined speed, the speed setting unit 112 may set the manual setting speed as a received speed change input. As such, in the manual speed setting mode, the target speed may be manually changed by the speed change input.

When the speed setting mode is changed to the manual speed setting mode, the speed setting unit 112 may set a first manual setting speed. For example, the speed setting unit 112 may set the first manual setting speed to be equal to the automatic setting speed.

The mode setting unit 113 may set the speed setting mode when the driving control system 100 is enabled as the automatic speed setting mode. Alternatively, the mode setting unit 113 may set the speed setting mode to be opposite to the automatic speed setting mode.

The mode setting unit 113 may change the speed setting mode of the driving control system 100 depending on the speed change input. The mode setting unit 113 may change the speed setting mode to the manual speed setting mode when receiving the speed change input in the automatic speed setting mode and may change the speed setting mode to the automatic speed setting mode when the manual setting speed changed by the speed change input coincides with the automatic setting speed in the manual speed setting mode. The driving control system 100 may use only the first input unit 120 receiving the speed change input without the driver performing complicated operations to effectively change the speed setting modes of two modes of the automatic speed setting mode and the manual speed setting mode.

According to the exemplary embodiment of the present disclosure, the driving control system 100 may include a separate second input unit 140 which receives the mode change input directly changing a mode in addition to the first input unit 120 receiving the speed change input. Therefore, the driving control system 100 may perform the direct mode change using the second input unit 140. That is, the mode setting unit 113 may receive the mode change input through the second input unit 140 and change the speed setting mode depending on the received mode change input.

The acquisition unit 114 may acquire road information depending on a position of a vehicle using monitoring devices 130 such as navigation 131 and a camera 132. For example, the acquisition unit 114 may acquire a speed limit of a driving road of a vehicle, a kind of driving roads (for example, express highway, national road, and the like) of a vehicle, a position (for example, entrance into a tollgate, entrance into a rest area, entrance into interchange (IC)/junction cross (JC), and the like) of a vehicle, and the like. For example, the acquisition unit 114 may use the navigation 131 of the vehicle to acquire the speed limit of the driving road of the vehicle from the road information acquired depending on the position of the vehicle. Alternatively, the acquisition unit 114 may use the camera 132 attached to the vehicle to detect the speed limit from a recognized sign. In this case, the acquisition unit 114 may use a traffic sign recognition (TSR) technology.

The first input unit 120 may receive the speed change input. According to the exemplary embodiment of the present disclosure, the first input unit 120 may be a steering wheel switch which is positioned at a steering wheel of the vehicle. For example, the steering wheel switch may be implemented as a speed increasing switch and a speed decreasing switch. As a result, the driver may use the speed increasing switch or the speed decreasing switch which is positioned at the steering wheel of the vehicle to increase or decrease the current manual setting speed. Further, in the automatic speed setting mode, the driver operates any one of the speed increasing switch and the speed decreasing switch which are positioned at the steering wheel of the vehicle to change the speed setting mode to the manual speed setting mode.

The monitoring device 130 may monitor the road information of the driving road of the vehicle. The monitoring device 130 may include the navigation 131 or the camera 132. However, the monitoring device is not limited thereto, and the monitoring device 130 may include all the devices which may monitor the road information of the driving road of the vehicle such as Radar.

According to various exemplary embodiments of the present disclosure, the driving control system 100 may further include the second input unit 140 receiving the mode change input which directly changes the speed setting mode.

According to various exemplary embodiments of the present disclosure, the driving control system 100 may further include a display unit (not illustrated) which displays the target speed set by the speed setting unit 112. According to various exemplary embodiments of the present disclosure, the display unit (not illustrated) may display the target speed by different colors depending on the speed setting mode. This will be described in detail with reference to FIGS. 4A and 4B.

Figure 2:
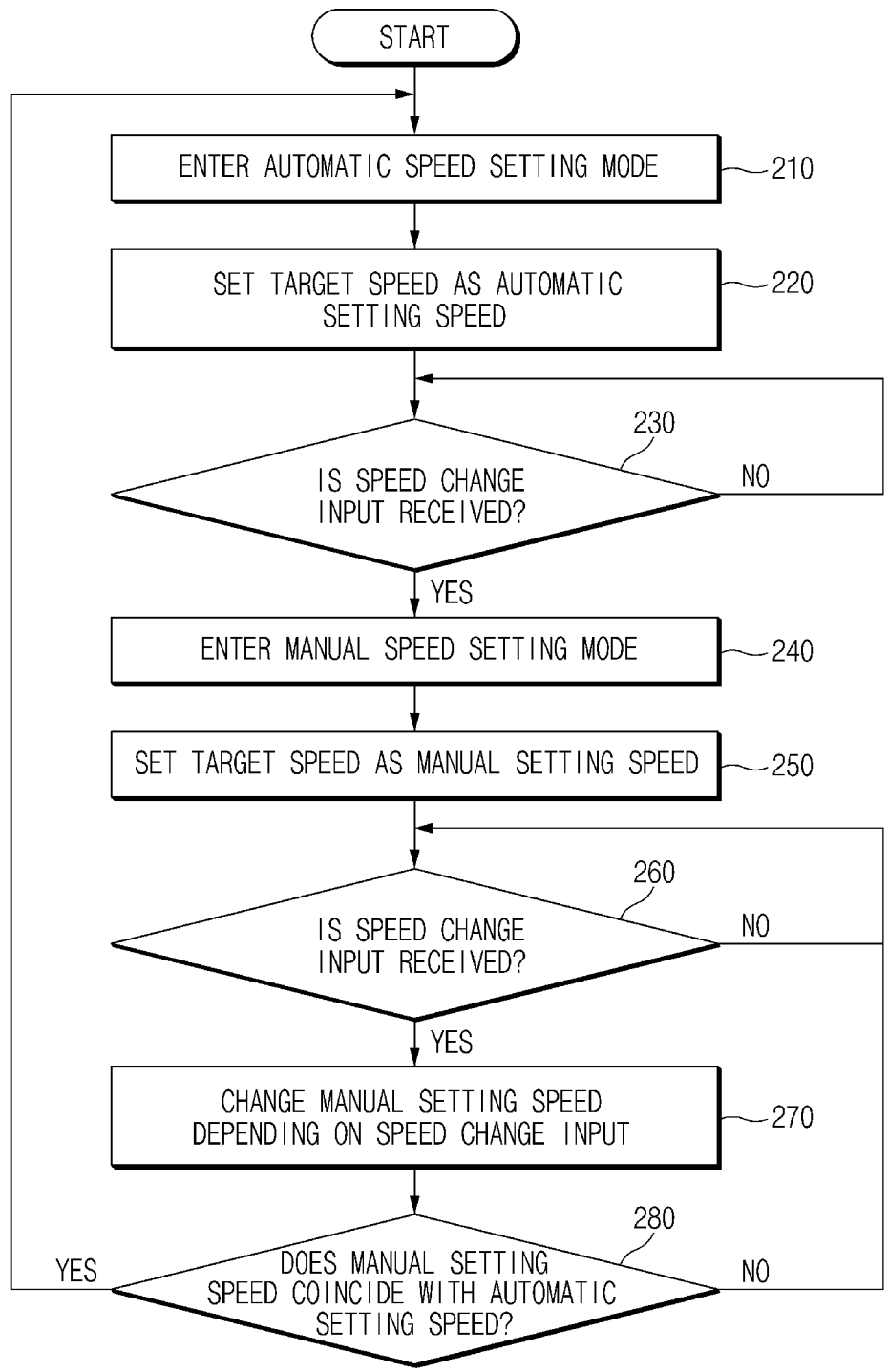
FIG. 2 is a flow chart illustrating a method for changing a speed setting mode using a driving control system according to an exemplary embodiment of the present disclosure.

FIG. 2 is a flow chart illustrating a method for changing a speed setting mode using a driving control system according to an exemplary embodiment of the present disclosure.

A flow chart illustrated in FIG. 2 is configured of steps which are processed by the driving control system 100 illustrated in FIG. 1. Therefore, although omitted in the following description, the content describing the driving control system 100 illustrated in FIG. 1 may be applied to the flow chart illustrated in FIG. 2.

In step 210, the driving control system 100 may enter the automatic speed setting mode. For example, the control module 110 may set the speed setting mode when the driving control system 100 is enabled as the automatic speed setting mode. When the driving control system 100 is enabled, the driving control system 100 according to the exemplary embodiment of the present disclosure starts in the automatic speed setting mode but is not limited thereto, and therefore may start in the manual speed setting mode. For example, when the driving control system 100 is enabled, the control module 110 may set the speed setting mode as the manual speed setting mode and receive the speed change input which changes the manual setting speed through the first input unit 120 in the manual speed setting mode.

In step 220, the control module 110 may set the target speed as the automatic setting speed. The automatic setting speed represents a speed which is automatically set by the system without the user's intervention. According to the exemplary embodiment of the present disclosure, the automatic setting speed may be set depending on the speed limit of the driving road of the vehicle. For example, when the vehicle drives a driving road having a speed limit of 100 km/h, the automatic setting speed may be set to be 100 km/h. When the vehicle enters a driving road having a speed limit of 110 km/h, the automatic setting speed may be changed from 100 km/h to 110 km/h.

In step 230, the control module 110 may determine whether the speed change input is received through the first input unit 120. When the speed change input is received through the first input unit 120 in the automatic speed setting mode, the control module 110 may proceed to step 240. Otherwise, the control module 110 may again perform step 230. Until the speed change input is received, the control module 110 repeatedly performs step 230 and the driving control system 100 may keep the current automatic speed setting mode.

In step 240, the driving control system 100 may enter the manual speed setting mode. That is, when the speed change input is received through the first input unit 120 in the automatic speed setting mode, the control module 110 may set the speed setting mode to the manual speed setting mode.

In step 250, the control module 110 may set the target speed as the manual setting speed. The manual setting speed is the speed which is manually set by the driver and may be set depending on the speed change input received through the first input unit 120. According to the exemplary embodiment of the present disclosure, the first manual setting speed may be the automatic setting speed depending on the current driving road of the vehicle. For example, when the vehicle drives the driving road having a speed limit of 100 km/h and then receives the speed change input, the first manual setting speed may be 100 km/h. However, the first manual setting speed is not limited thereto, and the first manual setting speed may be variously set depending on the current driving speed of the vehicle, the previous manual setting speed, or the like.

In step 260, the control module 110 may determine whether the speed change input is received through the first input unit 120. When receiving the speed change input in the manual speed setting mode, the control module 110 may proceed to step 270. Otherwise, the control module 110 may again perform step 260. Until the speed change input is received, the control module 110 repeatedly performs step 260 and the driving control system 100 may keep the current manual speed setting mode.

In step 270, the control module 110 may change the manual setting speed depending on the speed change input. According to the exemplary embodiment of the present disclosure, the speed change input received in the manual speed setting mode may be a form in which the current manual setting speed is increased or decreased. For example, the first input unit 120 may be implemented as two switches of the speed increasing switch and the speed decreasing switch. For example, the current manual setting speed may be increased or decreased in a unit of 2 km/h depending on a kind of switches (speed increasing switch or speed decreasing switch) by which the speed change input is received. When the current manual setting speed is 100 km/h and the speed change input is received through the speed increasing switch, the manual setting speed may be increased from 100 km/h to 102 km/h. Alternatively, when the current manual setting speed is 100 km/h and the speed change input is received through the speed decreasing switch, the manual setting speed may be decreased from 100 km/h to 98 km/h.

In step 280, the control module 110 may compare the manual setting speed with the automatic setting speed to determine whether the manual setting speed coincides with the automatic setting speed. If it is determined that the manual setting speed coincides with the automatic setting speed, the control module 110 may proceed the automatic speed setting mode, that is, step 210. If it is determined that the manual setting speed does not coincide with the automatic setting speed, the control module 110 may return to step 260 to again determine whether the speed change input is received. For example, when the vehicle is driving on the driving road having a speed limit of 100 km/h in the manual speed setting mode, the current automatic setting speed may be 100 km/h and when the manual setting speed changed by the speed change input is 100 km/h, the driving control system 100 may enter the automatic speed setting mode. In the above example, when the manual setting speed changed by the speed change input is 120 km/h, the driving control system 100 keeps the manual speed setting mode and may wait for the next speed change input.

A method for changing a speed setting mode using the driving control system 100 may be repeated until the driving control system 100 is disabled.

As described above, the driving control system 100 may use only the first input unit 120 receiving the speed change input without the driver performing the complicated operations to set the manual setting speed and simply change the speed setting mode. The driving control system 100 according to various exemplary embodiments of the present disclosure may provide the intuitive user interface to enhance the convenience of a driver.

Figure 3:
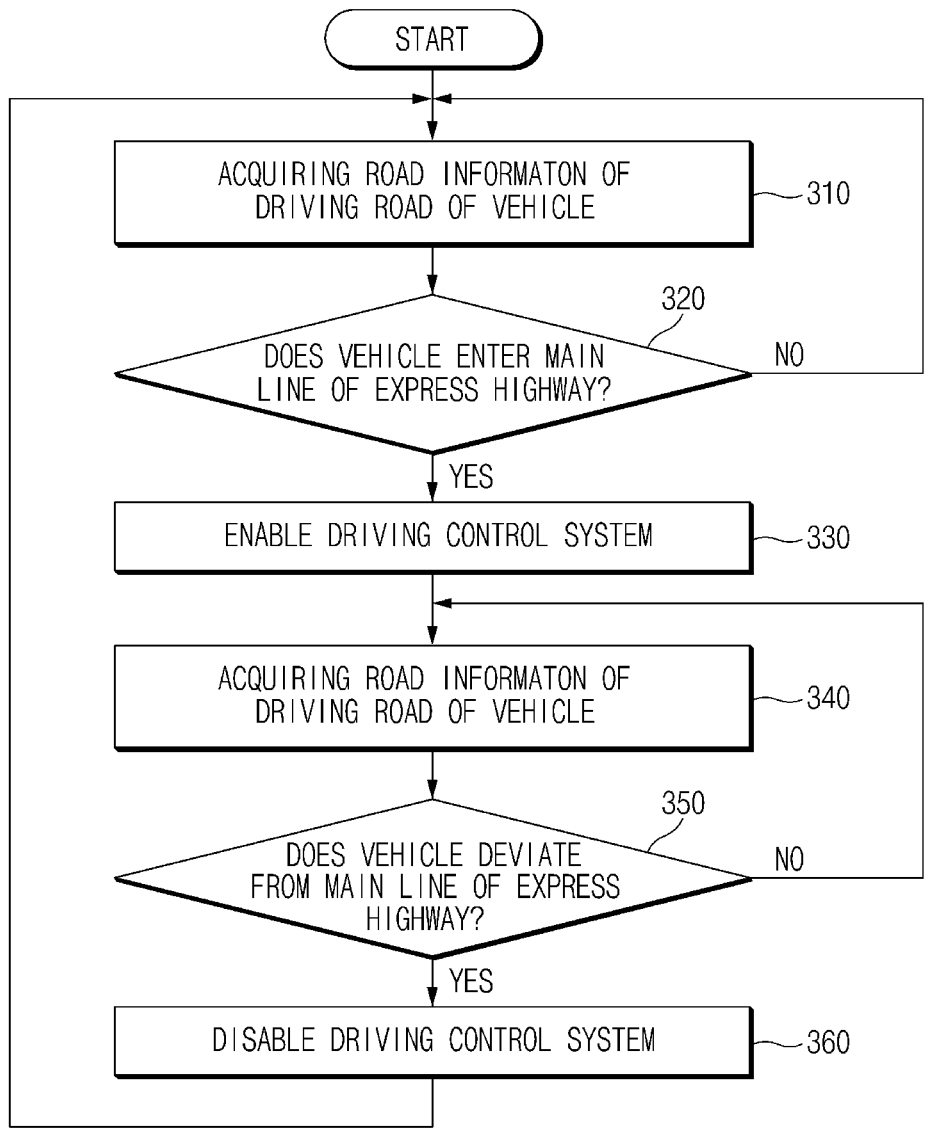
FIG. 3 is a flow chart illustrating a method for enabling or disabling a driving control system according to an exemplary embodiment of the present disclosure.

FIG. 3 is a flow chart illustrating a method for enabling or disabling a driving control system according to an exemplary embodiment of the present disclosure.

A flow chart illustrated in FIG. 3 is configured of steps which are processed by the driving control system 100 illustrated in FIG. 1. Therefore, although omitted in the following description, the content describing the driving control system 100 illustrated in FIG. 1 may be applied to the flow chart illustrated in FIG. 3.

In step 310, the control module 110 may acquire the road information of the driving road of the vehicle. The control module 110 may acquire the road information of the driving road of the vehicle using the monitoring devices 130 such as the navigation 131 and the camera 132.

In step 320, the control module 110 may determine whether the vehicle enters a main line of an express highway based on the acquired result. For example, the acquisition unit 114 may use the navigation 131 of the vehicle to determine whether the vehicle enters the main line of the express highway from the road information acquired depending on the position of the vehicle. Alternatively, the acquisition unit 114 may use the camera 132 attached to the vehicle to recognize a highway sign and detect whether the vehicle enters the express highway from the recognized sign.

If the control module 110 determines that the vehicle enters a main line of an express highway based on the acquired result, the driving control system 100 may be enabled in step 330. Otherwise, the control module 110 may again return to step 310 to continuously acquire the driving road of the vehicle.

In step 340, the control module 110 may acquire the road information of the driving road of the vehicle.

In step 350, the control module 110 may determine whether the vehicle deviates from the main line of the express highway of the vehicle. For example, the acquisition unit 114 may use the navigation 131 of the vehicle to determine whether the vehicle deviates from the main line of the express highway from the road information acquired depending on the position of the vehicle. Alternatively, the acquisition unit 114 may use the camera 132 attached to the vehicle to detect signs such as IC/JC and a tollgate. The acquisition unit 114 may determine that the vehicle deviates from the express highway when the vehicle enters the IC/JC or the tollgate.

When the vehicle deviates from the main line of the express highway, the control module 110 may proceed to step 360. Otherwise, the control module 110 may again return to step 340 to continuously acquire the road information of the driving road of the vehicle.

In step 360, the driving control system 100 may be disabled. For example, the control module 110 may disable the driving control system 110 before a predetermined distance where the vehicle deviates from the main line of the express highway. For example, when the monitoring device 130 monitors that the vehicle enters an open type tollgate, the control module 110 may disable the driving control system 100 before a predetermined distance (for example, before 500 m) from the open type tollgate.

Figure 4A:
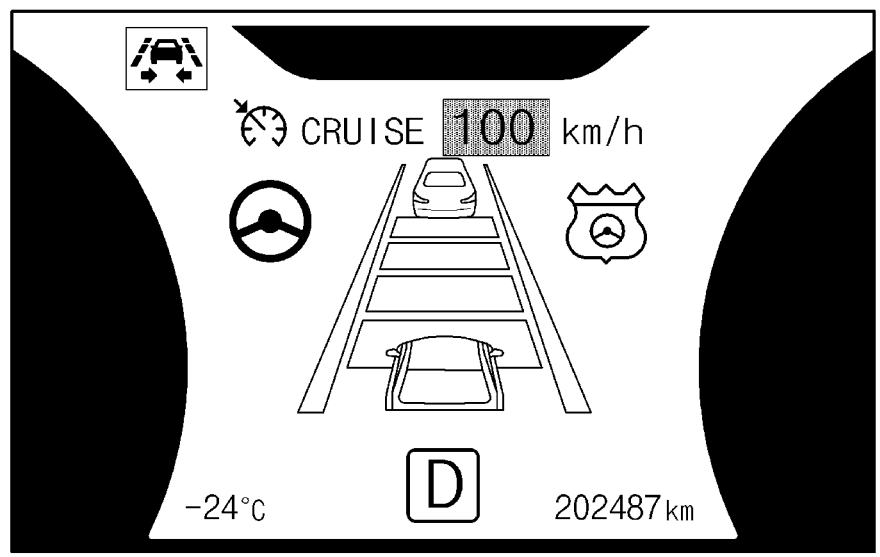
FIGS. 4A and 4B are diagrams illustrating an example of a screen displaying a target speed depending on the speed setting mode using the driving control system according to the exemplary embodiment of the present disclosure.
Figure 4B:
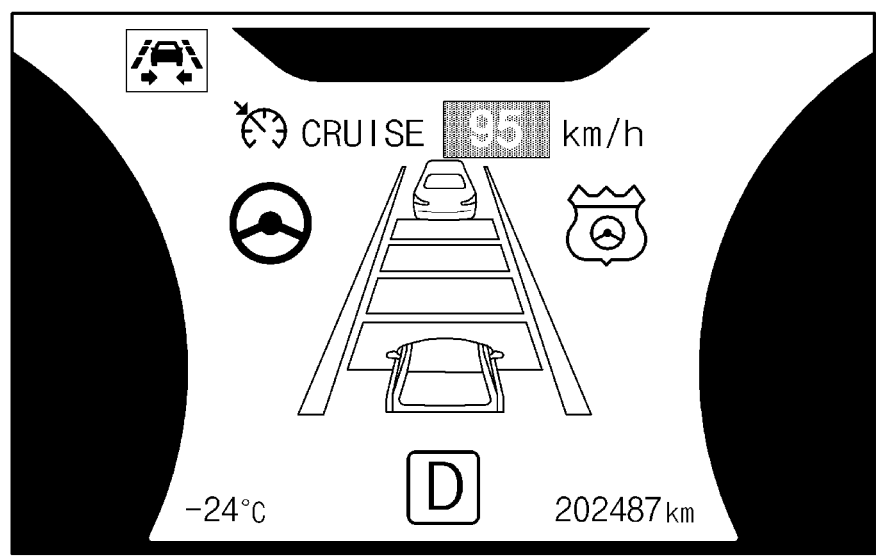

FIGS. 4A and 4B are diagrams illustrating an example of a screen displaying a target speed depending on the speed setting mode using the driving control system according to the exemplary embodiment of the present disclosure.

FIG. 4A illustrates an example of the screen displaying the target speed when the driving control system 100 is in the automatic speed setting mode and FIG. 4B illustrates an example of the screen displaying the target speed when the driving control system 100 is in the manual speed setting mode.

A 'cruise' displayed at an upper end of the screen of FIGS. 4A and 4B may represent the state in which the driving control system 100 of the vehicle is enabled. A lane display just therebeneath may represent that the lane guidance (LG) function of letting the vehicle be driven along a center of a lane is operated. A display just right of the lane may represent that the current vehicle is driving on the express highway. A number just right of the 'cruise' display may represent a currently set target speed. However, as long as the screen is not limited to examples illustrated in FIGS. 4A and 4B, the screen of the driving control system 100 may be displayed in various forms.

According to the exemplary embodiment of the present disclosure, as illustrated in FIGS. 4A and 4B, the target speed in the automatic speed setting mode and the target speed in the manual speed setting mode may be represented by different colors. For example, the target speed in the automatic speed setting mode may be represented by green and the target speed in the manual speed setting mode may be represented by white. Therefore, the driver may recognize whether the speed setting mode of the current driving control system 100 is the automatic speed setting mode or the manual speed setting mode only by colors of the target speed displayed on the screen.

In the present specification, 'one embodiment' of principles of the present disclosure and various changes of the expression means that specific features, structures, characteristics, and the like, associated with the embodiment are included in at least one embodiment of the principle of the present disclosure Therefore, the expression 'on embodiment' and any other modification examples disclosed throughout the present specification do not necessarily mean the same embodiment.

As described above, according to the exemplary embodiments of the present disclosure, it is possible to provide a driving control system of a vehicle and a method for changing a speed setting mode using the same capable of intuitively changing the speed setting mode by a simple operation. Therefore, it is possible to increase the convenience of a user and prevent risks due the dispersion of the driver's eye or concentration or the poor driving of the driver while driving.

All the embodiments and conditional examples disclosed in the present specification are described to help a person having ordinary skilled in the art to which the present disclosure pertains to understand the principle and concept of the present disclosure and those skilled in the art may be understood that the present disclosure may be implemented in a modified form within a range which does not deviating from the essential characteristics of the present disclosure. Therefore, the exemplary embodiments disclosed herein should be considered in an illustrative aspect rather than a restrictive aspect. The scope of the present disclosure should be defined by the following claims rather than the above-mentioned description, and all technical spirits equivalent to the following claims should be interpreted as being included in the present disclosure.

What is claimed is:

1. A driving control system of a vehicle, comprising:
   a first input unit configured to receive a speed change input; and
   a controller configured to:
      set a target speed as one of an automatic setting speed and a manual setting speed depending on a speed setting mode,
      control a driving speed of the vehicle depending on the target speed set,
      receive the speed change input from the first input unit, and
      change the speed setting mode to a manual speed setting mode when receiving the speed change input in an automatic speed setting mode, and change the speed setting mode to the automatic speed setting mode when the manual setting speed coincides with the automatic setting speed in the manual speed setting mode.

2. The driving control system of a vehicle according to claim 1, wherein when the driving control system is enabled, the controller is configured to change the speed setting mode to the automatic speed setting mode.

3. The driving control system of a vehicle according to claim 1, wherein when the speed setting mode is changed to the manual speed setting mode, the controller is configured to set a first manual setting speed to be equal to the automatic setting speed.

4. The driving control system of a vehicle according to claim 1, wherein the driving control system is enabled upon receiving a signal from an acquisition unit indicating that the vehicle enters an express highway and is disabled upon receiving another signal from the acquisition unit indicating that the vehicle deviates from the express highway.

5. The driving control system of a vehicle according to claim 1, further comprising:
   a second input unit configured to receive a mode change input,
   wherein the controller changes the speed setting mode depending on the received mode change input from the second input unit.

6. The driving control system of a vehicle according to claim 1, wherein the first input unit is a steering wheel switch which is positioned at a steering wheel of the vehicle, and
   a current manual setting speed is increased or decreased depending on the speed change input received through the steering wheel switch in the manual speed setting mode.

7. The driving control system of a vehicle according to claim 1, wherein the automatic setting speed is changed depending on a speed limit of a driving road of the vehicle and the manual setting speed is changed depending on the speed change input received in the manual speed setting mode.

8. The driving control system of a vehicle according to claim 7, further comprising:
   an acquisition unit configured to monitor the speed limit,
   wherein the acquisition unit acquires the speed limit based on a position of the vehicle determined by navigation of the vehicle or detects the speed limit from a traffic sign recognized by a camera attached to the vehicle.

9. The driving control system of a vehicle according to claim 1, further comprising:

a display unit configured to display the target speed,
wherein the display unit displays the target speed with different colors depending on the speed setting mode.

10. A method for changing a speed setting mode in a driving control system of a vehicle, comprising:
setting a target speed as an automatic setting speed in an automatic speed setting mode;
receiving a speed change input in the automatic speed setting mode;
changing the speed setting mode to a manual speed setting mode based on the speed change input;
setting the target speed as a manual setting speed in the manual speed setting mode;
receiving a speed change input in the manual speed setting mode;
changing the manual setting speed based on the speed change input;
determining whether the manual setting speed coincides with the automatic setting speed in the manual speed setting mode;
changing the speed setting mode to the automatic speed setting mode based on the determination.

11. The driving control method for a vehicle according to claim 10, wherein the automatic setting speed is changed depending on a speed limit of a driving road of the vehicle.

12. The driving control method for a vehicle according to claim 10, further comprising: enabling the driving control system, wherein enabling the driving control system changes the speed setting mode to the automatic speed setting mode.

13. The driving control method for a vehicle according to claim 10, wherein during the step of changing the manual speed setting mode, a first manual setting speed is set to be equal to the automatic setting speed.

14. The driving control method for a vehicle according to claim 10, further comprising: receiving a signal indicating that the vehicle enters an express highway; enabling the driving control system based on the signal; receiving another signal indicating that the vehicle deviates from the express highway; and disabling the driving control system based on the another signal.

15. The driving control method for a vehicle according to claim 10, further comprising: the step of receiving a mode change input and changing the speed setting mode depending on the received mode change input.

16. The driving control method for a vehicle according to claim 10, wherein the speed change input is received through a steering wheel switch which is positioned at a steering wheel of the vehicle and a current manual setting speed is increased or decreased depending on the speed change input received through the steering wheel switch in the manual speed setting mode.

17. The driving control method for a vehicle according to claim 11, wherein the speed limit of the driving road is acquired from road information depending on a position of the vehicle using navigation of the vehicle or is detected from a recognized sign using a camera attached to the vehicle.

18. The driving control method for a vehicle according to claim 10, further comprising:
displaying the target speed,
wherein a color of the target speed is changed depending on the speed setting mode.

* * * * *